(12) United States Patent
Wang et al.

(10) Patent No.: US 9,152,448 B2
(45) Date of Patent: Oct. 6, 2015

(54) PERFORMANCE OF LOAD BALANCING MODULES WITH MIGRATION AWARENESS

(75) Inventors: Yong Wang, Sunnyvale, CA (US); Weiqing Wu, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 533 days.

(21) Appl. No.: 13/469,276

(22) Filed: May 11, 2012

(65) Prior Publication Data
US 2013/0305242 A1 Nov. 14, 2013

(51) Int. Cl.
G06F 9/455 (2006.01)
G06F 9/50 (2006.01)
G06F 9/54 (2006.01)

(52) U.S. Cl.
CPC .......... *G06F 9/45558* (2013.01); *G06F 9/5088* (2013.01); *G06F 9/542* (2013.01); *G06F 2009/4557* (2013.01)

(58) Field of Classification Search
None
See application file for complete search history.

(56) References Cited

U.S. PATENT DOCUMENTS

| 8,190,769 | B1 * | 5/2012 | Shukla et al. ............... 709/238 |
| 8,442,955 | B2 * | 5/2013 | Al Kiswany et al. ......... 707/692 |
| 2008/0104608 | A1 * | 5/2008 | Hyser et al. ................... 718/105 |
| 2010/0332657 | A1 * | 12/2010 | Elyashev et al. ............. 709/226 |
| 2011/0119670 | A1 * | 5/2011 | Sugumar et al. ................ 718/1 |
| 2011/0194563 | A1 * | 8/2011 | Shen et al. ............... 370/395.52 |
| 2011/0231839 | A1 * | 9/2011 | Bennett et al. ................... 718/1 |
| 2011/0307889 | A1 * | 12/2011 | Moriki et al. ..................... 718/1 |
| 2011/0321041 | A1 * | 12/2011 | Bhat et al. ......................... 718/1 |
| 2012/0017031 | A1 * | 1/2012 | Mashtizadeh et al. ........... 711/6 |
| 2013/0054813 | A1 * | 2/2013 | Bercovici et al. ............. 709/226 |
| 2013/0081013 | A1 * | 3/2013 | Plondke et al. ................... 718/1 |
| 2013/0275979 | A1 * | 10/2013 | Tsirkin ............................ 718/1 |

* cited by examiner

*Primary Examiner* — Kenneth Tang

(57) ABSTRACT

Embodiments perform migration-aware load balancing in virtual data centers. One or more load balancing modules in a host distribute data requests from clients to one or more servers implemented as virtual machines (VMs). The load balancing modules are notified of VM migration (e.g., live migration) prior to the VM migration and reduce the load on the VM to be migrated. After being notified of completion of VM migration, the load balancing modules increase the load on the migrated VM. Such migration notifications enable the load balancing modules to prevent or reduce performance degradation and migration duration, among other aspects.

19 Claims, 9 Drawing Sheets

PERFORMANCE OF LOAD BALANCING MODULES WITH MIGRATION AWARENESS

BACKGROUND

Some existing systems deploy web servers as virtual machines (VMs) running on a single physical host. The host may have one, or a few, front-end virtual load balancers that operate to distribute traffic among the web servers so that no single server becomes a performance bottleneck. Operation of the load balancers is affected by surges in traffic loads and changing conditions of the web servers. For example, in a virtual data center, the VMs implementing the web servers are frequently migrated across physical hosts (e.g., due to address failures, congestion, or load rebalancing).

Live migration of VMs is a form of migration that allows high availability, transparent mobility, and consolidation. With live migration, running VMs are moved between hosts without disconnecting services executing inside the VMs. With existing systems, however, the load balancers are unaware of the underlying migration states of the VMs. For example, the load balancers treat the VMs undergoing migration no differently from the VMs that are not being migrated. As a result, the load balancers continuously dispatch new connections to the VMs being migrated introducing performance challenges into the migration. Exemplary performance challenges include, but are not limited to, an increase in memory to copy during a pre-copy phase of migration, memory-related bookkeeping, and additional downtime for saving and restoring non-memory states.

Some of the existing load balancing algorithms track web server status (e.g., server load, connection count, response time, etc.) by, for example, passively probing the web servers. This technique, however, only detects performance degradation after the performance degradation has occurred. As such, it is difficult for existing load balancers to respond (e.g., redirect traffic elsewhere) to short resource spike usage scenarios introduced by migration of VMs.

SUMMARY

One or more embodiments described herein reduce performance degradation during a migration or other operation affecting virtual machines (VMs). A migration notification is sent, before migration of one of the VMs, to one or more load balancing modules distributing data requests to the VMs. In response to the migration notification, the load balancing modules reduce the load on the VM to be migrated. In some embodiments, the load balancing modules reduce the load by reducing a quantity of new connections established to the VM while maintaining the existing connections. After migration completes, the load balancing modules increase the load on the newly migrated VM.

This summary introduces a selection of concepts that are described in more detail below. This summary is not intended to identify essential features or to limit in any way the scope of the claimed subject matter.

BRIEF DESCRIPTION OF THE DRAWINGS

Corresponding reference characters indicate corresponding parts throughout the drawings.

DETAILED DESCRIPTION

Figure 1:
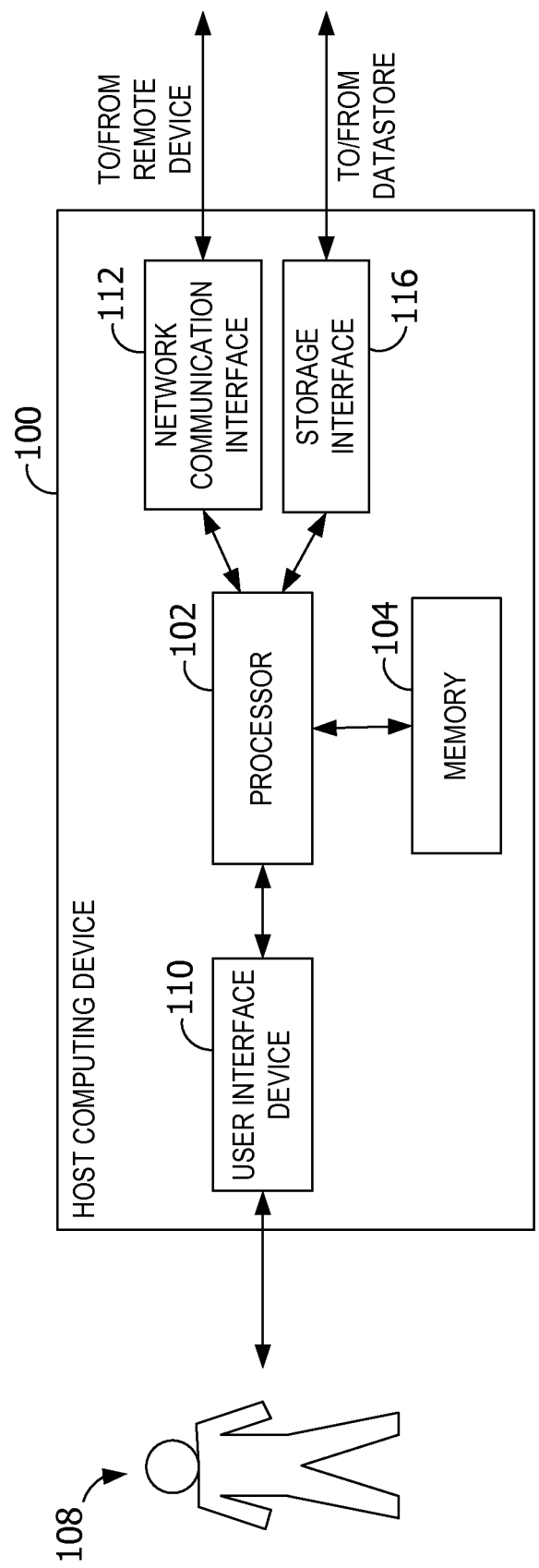
FIG. 1 is a block diagram of an exemplary host computing device.

Embodiments described herein provide a notification mechanism to inform applications and/or services of a status of backend servers (e.g., servers 702). For example, embodiments operate to reduce, prevent, or avoid performance degradation introduced by servers 702 undergoing migration. In some embodiments, servers 702 are implemented as virtual machines (VMs 235) processing data requests distributed by one or more virtual networking load balancers (e.g., load balancing modules 308) on a host computing device 100.

Prior to migration of at least one of servers 702, VM migration information is proactively fed to one or more load balancing modules 308 to enable load balancing modules 308 to adjust distribution of the data requests to servers 702 immediately before the migration process commences. For example, load balancing modules 308 reduce a load on the VM 235 to be migrated thereby reducing a duration of the migration. During migration, load balancing modules 308 re-distribute loads among the other servers 702 to ensure sufficient resources are allocated to the data requests. Such elastic redirection of the data requests results in better resource provisioning, less service unavailability, reduced migration time, reduced or avoided performance degradation, and few or no aborted connections. Further, migration downtime may also be reduced as the remaining states to be checkpointed during migration are also reduced.

Upon completion of the migration, load balancing modules 308 are notified of the completion and re-adjust distribution of the data requests. For example, load balancing modules 308 increase the load on the migrated VM 235.

Aspects of the disclosure are not limited to any particular load balancing technique. Rather, embodiments are operable with any load balancing technique such as dynamic weight-based algorithms that additionally factor in other information such as the loads on the remaining available servers 702 and system service level agreements (SLAs). This helps to prevent situations where the remaining available servers 702 become overloaded.

Further, embodiments described herein may be integrated with other dynamic application delivery control methodologies to obtain accurate status information regarding backend servers 702. Additionally, while described with reference to load balancing, aspects of the disclosure are operable, and may be integrated, with any data-intensive, distributed systems that dispatch data requests to a cluster of backend servers 702. Such distributed systems may include cloud-based products and services for mission-critical and latency-sensitive workloads. For example, embodiments are operable with Hadoop or other distributed computing systems, memcached or other distributed memory object caching systems, fault tolerant systems, and high availability systems that deploy multiple servers 702 for redundancy. Such systems benefit from the accurate knowledge of migration (e.g., live migration) in virtual data centers provided by aspects of this disclosure.

FIG. 1 is a block diagram of exemplary host computing device 100. Host computing device 100 includes a processor 102 for executing instructions. In some embodiments, executable instructions are stored in a memory 104. Memory 104 is any device allowing information, such as executable instructions and/or other data, to be stored and retrieved. For example, memory 104 may include one or more random access memory (RAM) modules, flash memory modules, hard disks, solid state disks, and/or optical disks.

Host computing device 100 may include a user interface device 110 for receiving data from a user 108 and/or for presenting data to user 108. User 108 may interact indirectly with host computing device 100 via another computing device such as VMware's vCenter Server or other management device. In some embodiments, user interface device 110 operates to receive data from user 108, while another device (e.g., a presentation device) operates to present data to user 108. In other embodiments, user interface device 110 has a single component, such as a touch screen, that functions to both output data to user 108 and receive data from user 108. In such embodiments, user interface device 110 operates as the presentation device for presenting information to user 108.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108. Aspects of the disclosure are operable with any quantity of general purpose or dedicated network communication interfaces 112. For example, there may be a plurality of network communication interfaces 112 for handling management traffic, high-throughput converged network/storage traffic, and live migration.

Host computing device 100 further includes a storage interface 116 that enables host computing device 100 to communicate with one or more datastores, which store virtual disk images, software applications, and/or any other data suitable for use with the methods described herein. In exemplary embodiments, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112. Aspects of the disclosure are operable with any quantity of storage interfaces 116.

Figure 2:
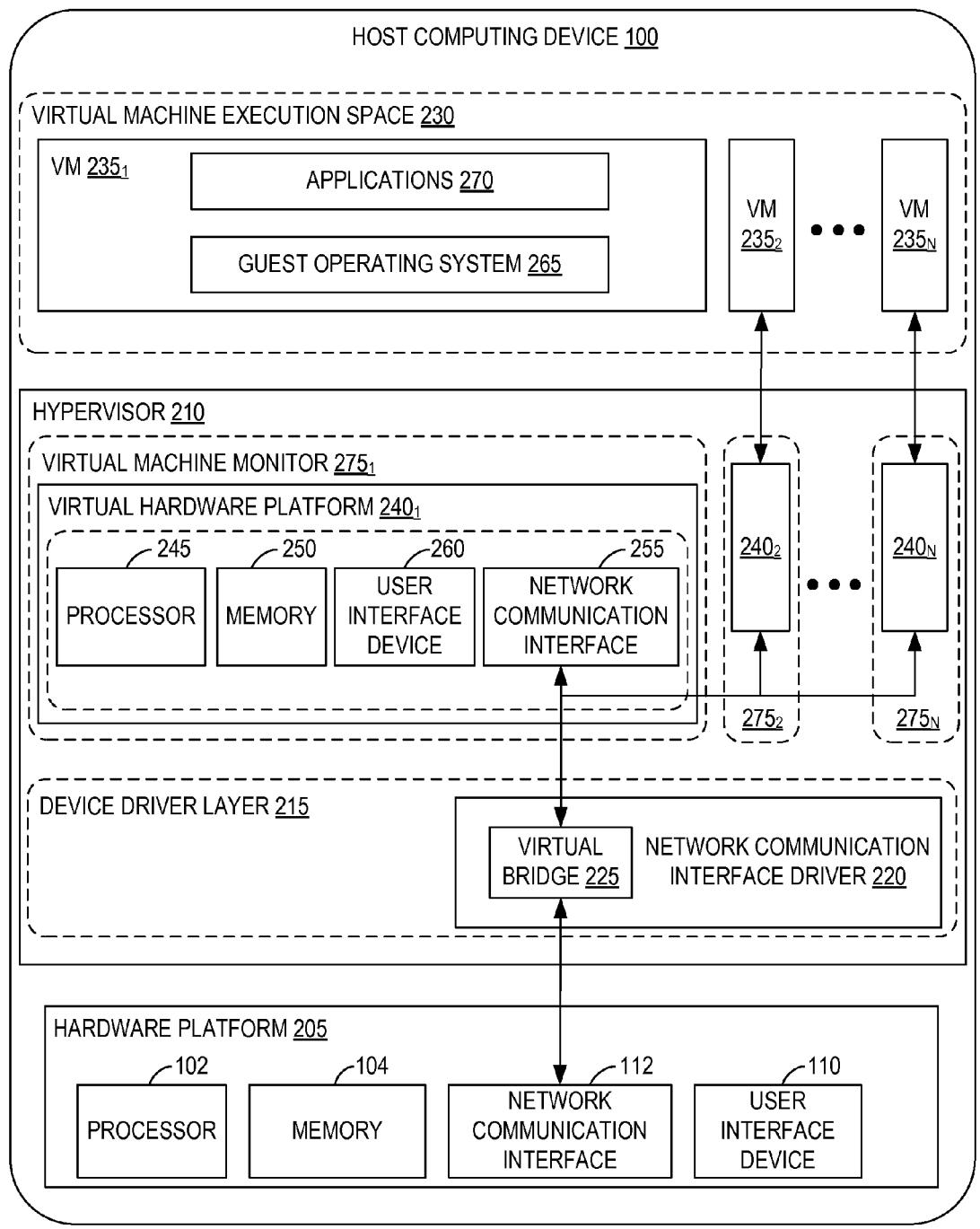
FIG. 2 is a block diagram of virtual machines (VMs) that are instantiated on a computing device, such as the host computing device shown in FIG. 1.

FIG. 2 depicts a block diagram of virtual machines $235_1$, $235_2$ ... $235_N$ that are instantiated on host computing device 100, which may be referred to as a host 314. Host computing device 100 includes a hardware platform 205, such as an x86 architecture platform. Hardware platform 205 may include processor 102, memory 104, network communication interface 112, user interface device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM $235_1$). Hypervisor 210 may manage (e.g., monitor, initiate, and/or terminate) execution of VMs $235_1$-$235_N$ according to policies associated with hypervisor 210, such as a policy specifying that VMs $235_1$-$235_N$ are to be automatically restarted upon unexpected termination and/or upon initialization of hypervisor 210. In addition, or alternatively, hypervisor 210 may manage execution VMs $235_1$-$235_N$ based on requests received from a device other than host computing device 100. For example, hypervisor 210 may receive an execution instruction specifying the initiation of execution of first VM $235_1$ from a management device via network communication interface 112 and execute the execution instruction to initiate execution of first VM $235_1$.

In some embodiments, memory 250 in first virtual hardware platform $240_1$ includes a virtual disk that is associated with or "mapped to" one or more virtual disk images stored in memory 104 (e.g., a hard disk or solid state disk) of host computing device 100. The virtual disk image represents a file system (e.g., a hierarchy of directories and files) used by first virtual machine $235_1$ in a single file or in a plurality of files, each of which includes a portion of the file system. In addition, or alternatively, virtual disk images may be stored in memory 104 of one or more remote computing devices 100, such as in a storage area network (SAN) configuration. In such embodiments, any quantity of virtual disk images may be stored by the remote computing devices 100.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM 235 in host computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Virtual hardware platforms $240_1$-$240_N$ may be considered to be part of virtual machine monitors (VMM) $275_1$-$275_N$ that implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, VMMs $275_1$-$275_N$ may be considered to be separate from hypervisor 210. One example of hypervisor 210 that may be used in an embodiment of the disclosure is included as a component in VMware's ESX brand software, which is commercially available from VMware, Inc.

Figure 3:
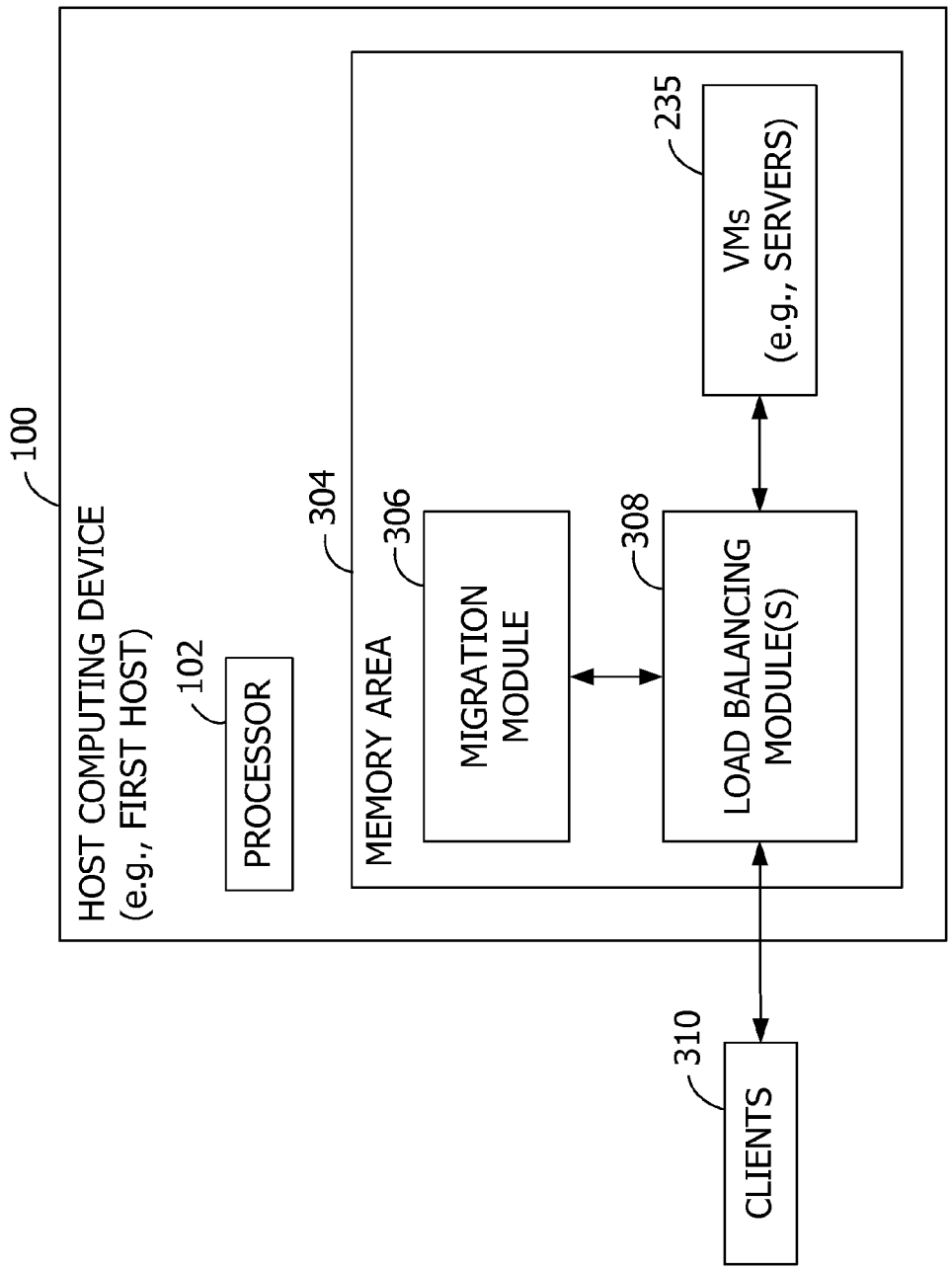
FIG. 3 is a block diagram of an exemplary computing device, such as the host computing device shown in FIG. 1, for implementing the migration module and one or more load balancing modules.

FIG. 3 is a block diagram of an exemplary computing device, such as host computing device 100 shown in FIG. 1, for implementing a migration module 306 and one or more load balancing modules 308.

Host computing device 100 represents any device executing instructions (e.g., as application programs, operating system functionality, or both) to implement the operations and functionality described herein. For example, host computing device 100 executes instructions to implement the operations illustrated and described with reference to FIG. 4 and FIG. 5. Host computing device 100 may include any computing device or processing unit. For example, host computing device 100 may represent a group of processing units or other computing devices, such as in a cloud computing configuration.

Host computing device 100 has at least one processor such as processor 102 and a memory area 304 such as memory 104. Processor 102 includes any quantity of processing units. In some embodiments, multiple processors 102 provide opportunities for parallelism, such as enabling tens or hundreds of VMs to execute behind one or more load balancers. Processor 102 is programmed to execute computer-executable instructions for implementing aspects of the disclosure. The instructions may be performed by processor 102 or by multiple processors executing within host computing device 100, or performed by a processor external to host computing device 100. In some embodiments, processor 102 is programmed to execute instructions such as those illustrated in the figures to reduce performance degradation of VMs 235 during migration. The instructions may be embodied on one or more computer-readable storage media such as memory 104.

Memory area 304 includes any quantity of computer-readable media associated with or accessible by host computing device 100. Memory area 304, or portions thereof, may be internal to host computing device 100, external to host computing device 100, or both.

In the example of FIG. 3, memory area 304 stores migration module 306 and one or more load balancing modules 308. While each host computing device 100 is described in some embodiments herein as containing one migration module 306, each host computing device 100 in other embodiments may include multiple migration modules 306. Migration module 306 operates to detect, monitor, or otherwise manage migration of one or more VMs 235 accessible to host computing device 100. For example, migration module 306 detects, or is notified of, an upcoming migration of one of VMs 235 from host computing device 100 (e.g., a first host) to another computing device (e.g., a second host). Migration module 306 communicates with load balancing modules 308, as described herein, to mitigate any performance issues that may arise during the migration. While migration module 306 may be local to a host such as host computing device 100 in some embodiments, load balancing modules 308 may communicate with multiple hosts. For example, one of load balancing modules 308 in a first host (e.g., host computing device 100) may communicate with one of VMs 235 that has migrated from the first host to a second host using layer 3 connections (see FIGS. 7, 8, and 9 below).

Load balancing modules 308 operate to distribute data requests received from one or more clients 310 to one or more of VMs 235. Clients 310 represent any entity requesting data and/or providing data via the data requests. For example, clients 310 may represent web browsers executing on client computing devices. In this example, VMs 235 represent servers 702 such as web servers for responding to the data requests (e.g., requests for content) from clients 310. While VMs 235 are illustrated in FIG. 3 as being contained within host computing device 100, aspects of the disclosure are operable with one of more of VMs 235 being located in other hosts. An exemplary load balancing module 308 includes the vShield traffic load balancer by VMware, Inc.

Aspects of the disclosure are operable with load balancing modules 308 implementing any load balancing algorithms for distributing the data requests to VMs 235. For example, load balancing modules 308 may attempt to evenly distribute the data requests across VMs 235, or may weight distribution of the data requests based on characteristics of each VM 235 such as resource availability, resource capability, load, hardware version, compatibility, etc.

Figure 4:
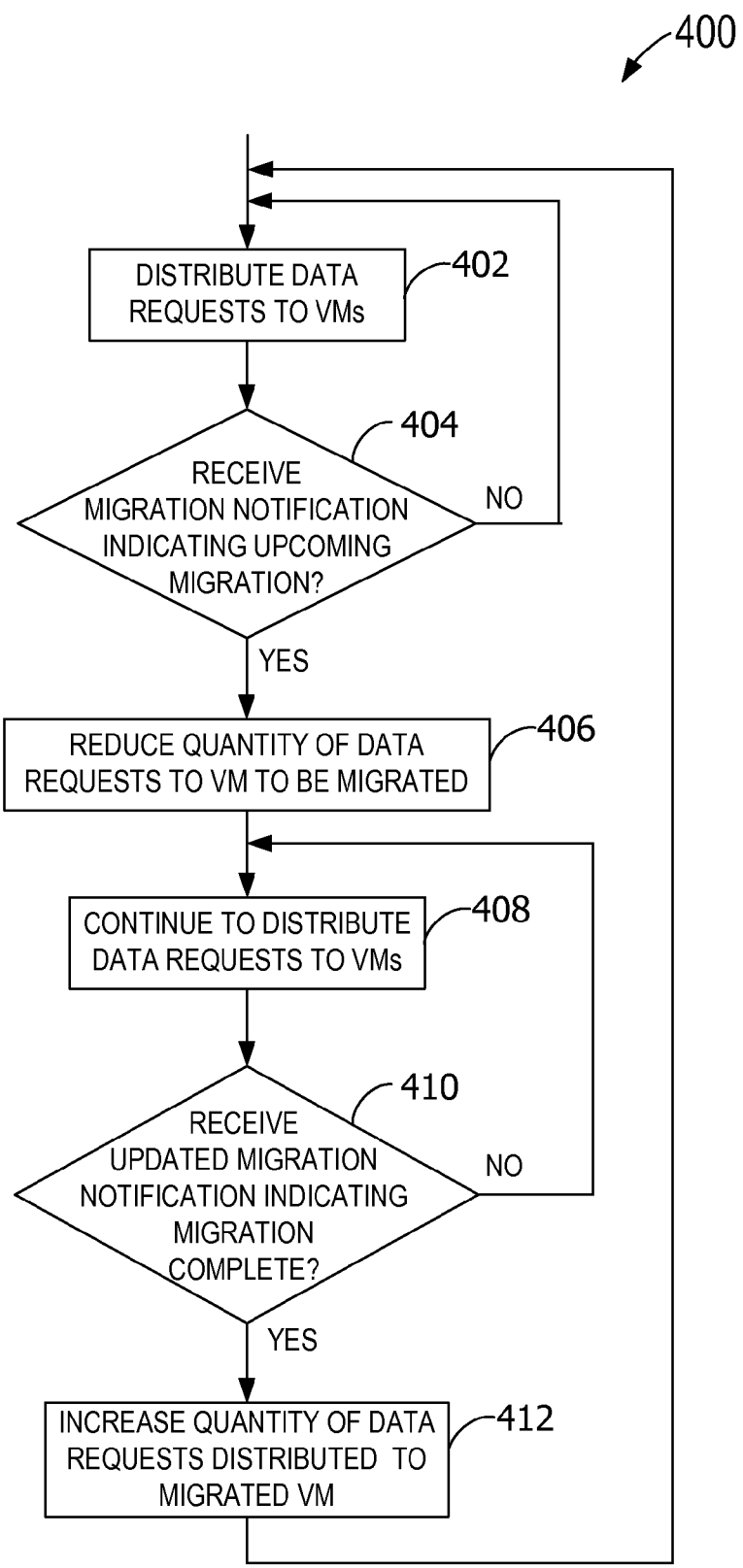
FIG. 4 is a flowchart of an exemplary method performed by the load balancing modules to adjust distribution of data requests responsive to a migration notification.

FIG. 4 is a flowchart of an exemplary method 400 performed by load balancing modules 308 to adjust distribution of data requests responsive to a migration notification. While method 400 is described with reference to execution by one or more of load balancing modules 308 (shown in FIG. 3), it is contemplated that method 400 may be performed by any component or module. Further, while FIG. 4 is described with reference to one load balancing module 308, the operations in FIG. 4 are operable with a plurality of load balancing modules 308.

At 402, load balancing module 308 executes on a first host (e.g., host computing device 100) to distribute data requests received from one or more of clients 310 or other computing devices to VMs 235 accessible to the first host. While distributing the data requests, load balancing module 308 listens for or is otherwise configured to receive a migration notification from migration module 306. For example, load balancing module 308 registers with migration module 306 to receive the migration notifications. In some embodiments, registration includes load balancing module 308 identifying migration module 306, and providing migration module 306 with identifiers of load balancing module 308 and VMs 235 accessible to load balancing module 308. In this manner, load balancing module 308 receives migration notifications relating only to VMs 235 accessible to load balancing module 308.

The migration notification indicates that at least one of VMs 235 will migrate from the first host to another host (e.g., second host). An exemplary migration notification identifies VM 235 to be migrated, a scheduled time for the migration to commence (e.g., described absolutely or relatively), and other details about the migration such as expected duration, identifier of the second host, etc. Load balancing module 308 receives the migration notification before the actual migration occurs or commences to enable load balancing module 308 to prepare for the migration. In some embodiments, the migration notifications take the form of interrupts or event notifications, and may be received by connection controller algorithms associated with load balancing modules 308. In some embodiments (e.g., those that contemplate message exchange in protocol layers), the migration notification may be in a form that uses protocols like hypertext transfer protocol (HTTP) or other application layer message exchange protocols.

For example, in response to receiving the migration notification at 404, load balancing modules 308 performs operations to reduce the load on VM 235 to be migrated. Aspects of the disclosure are operable with any operations performed that result in a decreased current and/or future load on VM 235 to be migrated. In some embodiments, load balancing module 308 reduces the quantity of data requests distributed to VM 235 to be migrated at 406. For example, load balancing module 308 reduces, or entirely prohibits, establishment of new connections to VM 235 to be migrated. In this example, VM 235 to be migrated continues to service existing connections. In this manner, the load on VM 235 to be migrated is at least contained, or reduced in some embodiments. The load, and load reduction, on VM 235 to be migrated may be measured absolutely, or relative to the loads (e.g., new connections established) on other VMs 235 accessible to the first host.

Reducing the load on the VM 235 to be migrated enables the migration to proceed faster and/or with fewer errors. For example, some embodiments of the disclosure are operable with two-phase, pre-copy-based, live migration. Pre-copy-based live migration includes a pre-copy phase in which the virtual memory of a source VM 235 (e.g., on a first host) is copied to a destination VM 235 (e.g., on a second host), and a stun phase in which non-memory state is similarly transferred and restored. The pre-copy phase may take several iterations as memory may change during the pre-copy phase (e.g., because the source VM 235 remains live), thus prompting another copy attempt. Reducing the load on the VM 235 reduces the likelihood the memory changes during the pre-copy phase. As such, the live migration completes faster when the virtual memory (and non-memory state) remains static (and smaller).

While described with reference to live migration in some embodiments, aspects of the disclosure are operable, however, with any form or type of migration.

In some embodiments, load balancing module 308 acknowledges receipt of the migration notification from migration module 306. In such embodiments, migration module 306 may then commence the migration process, or signal another module to commence the migration process. If, however, migration module 306 does not receive the acknowledgement from load balancing module 308 (e.g., within a pre-defined timeout duration), migration module 306 logs the absence of the acknowledgement and commences the migration process.

At 408, load balancing module 308 continues to distribute data requests to VMs 235 other than VM 235 to be migrated while listening for, or otherwise being configured to receive, an updated migration notification from migration module 306. The updated migration notification indicates that migration of VM 235 has completed. The updated migration notification may take any form. For example, the contents of the updated migration notification may appear similar to the migration notification that previously indicated an upcoming migration, with the exception that a flag or bit in the updated migration notification is set to indicate that migration has completed. In other embodiments, the updated migration notification bears little or no similarity to the migration notification. For example, the updated migration notification may represent a short message indicating that the migrated VM 235 is available to process an increased quantity of data requests from clients 310.

Upon receipt of the updated migration notification at 410, load balancing module 308 increases the quantity of data requests distributed to the migrated VM 235 at 412.

Still other embodiments contemplate no updated migration notification or other communication being sent from migration module 306 to load balancing module 308. For example, if the migration notification indicating an upcoming migration included an estimated duration for the migration, load balancing module 308 sets a timer or alarm that activates when the migration is expected to be complete. Upon activation of the alarm, load balancing module 308 automatically increases the quantity of data requests distributed to migrated VM 235. Migration module 306 or load balancing module 308 may inflate the estimated duration, or include some form of grace period, to account for unexpected delays occurring during migration. Alternatively or in addition, migration module 306 may send updated duration estimates to load balancing module 308 to enable load balancing module 308 to reset or otherwise adjust the timer or alarm (e.g., if migration is occurring slower or faster than expected).

Figure 5:
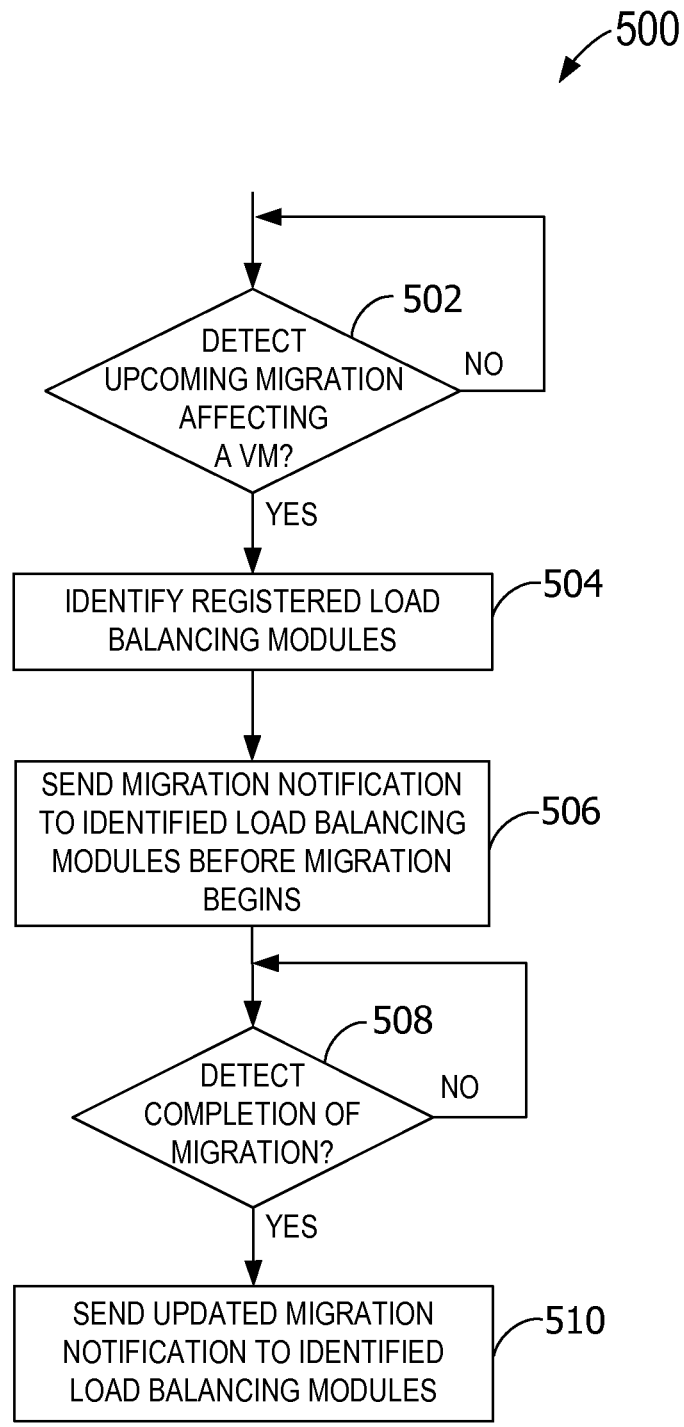
FIG. 5 is a flowchart of an exemplary method performed by the migration module to notify registered load balancing modules of an upcoming migration of a VM to a new host.

FIG. 5 is a flowchart of an exemplary method 500 performed by migration module 306 to notify registered load balancing modules 308 of an upcoming migration of one of VMs 235 to a new host. While method 500 is described with reference to execution by migration module 306 (shown in FIG. 3), it is contemplated that method 500 may be performed by any component or module. Further, the operations illustrated and described with reference to FIG. 5 may be implemented as instructions that, when executed by processor 102, cause processor 102 to improve load balancing performance during migration of VMs 235.

Additionally, the flow illustrated in FIG. 5 corresponds to migration module 306 managing one migration by sending migration notifications. Migration module 306, however, may handle multiple concurrent migrations. For example, migration module 306 may represent a multi-threaded application in which each thread manages at least one migration.

Migration module 306 is configured to detect or be notified of upcoming migrations of VMs 235 from the first host to another host (e.g., the second host). For example, migration module 306 receives a message from an administrator, receives a message from one or more of VMs 235, and/or accesses a migration schedule or other data indicating when migrations will occur. In this example, the migration schedule identifies upcoming migrations, VMs 235 affected, estimated migration durations, and other data.

When migration module 306 detects an upcoming migration affecting VM 235 accessible to the first host at 502, migration module 306 identifies one or more of load balancing modules 308 affected by the migration at 504. For example, migration module 306 searches or scans a set of registered load balancing modules 308 to identify affected load balancing modules 308 (e.g., load balancing modules 308 that are distributing data requests to VM 235 to be migrated).

At 506, migration module 306 sends the migration notification to each of the identified load balancing modules 308 before migration commences. Upon receipt of the migration notification, the identified load balancing modules 308 respond to the migration notification by reducing a quantity of data requests sent to VM 235 to be migrated. Migration module 306 sends the migration notification at some time prior to commencement of migration to allow load balancing modules 308 time to react, although the exact amount of time prior may vary and may be dependent on the expected response time of load balancing modules 308. In some embodiments, the migration notification is sent at least a tenth of a second prior to the migration occurring.

When migration module 306 detects completion of migration at 508, migration module 306 sends an updated migration notification to the affected load balancing modules 308 at 510 to indicate completion of the migration. Upon receipt of the updated migration notification, the load balancing modules 308 respond to the updated migration notification by increasing a quantity of data requests sent to the migrated VM 235. The updated migration notification may further include a description of the resources available to, and/or shared by, the first host and the second host, along with any other information relevant to a load balancing policy applied by load balancing modules 308.

Figure 6:
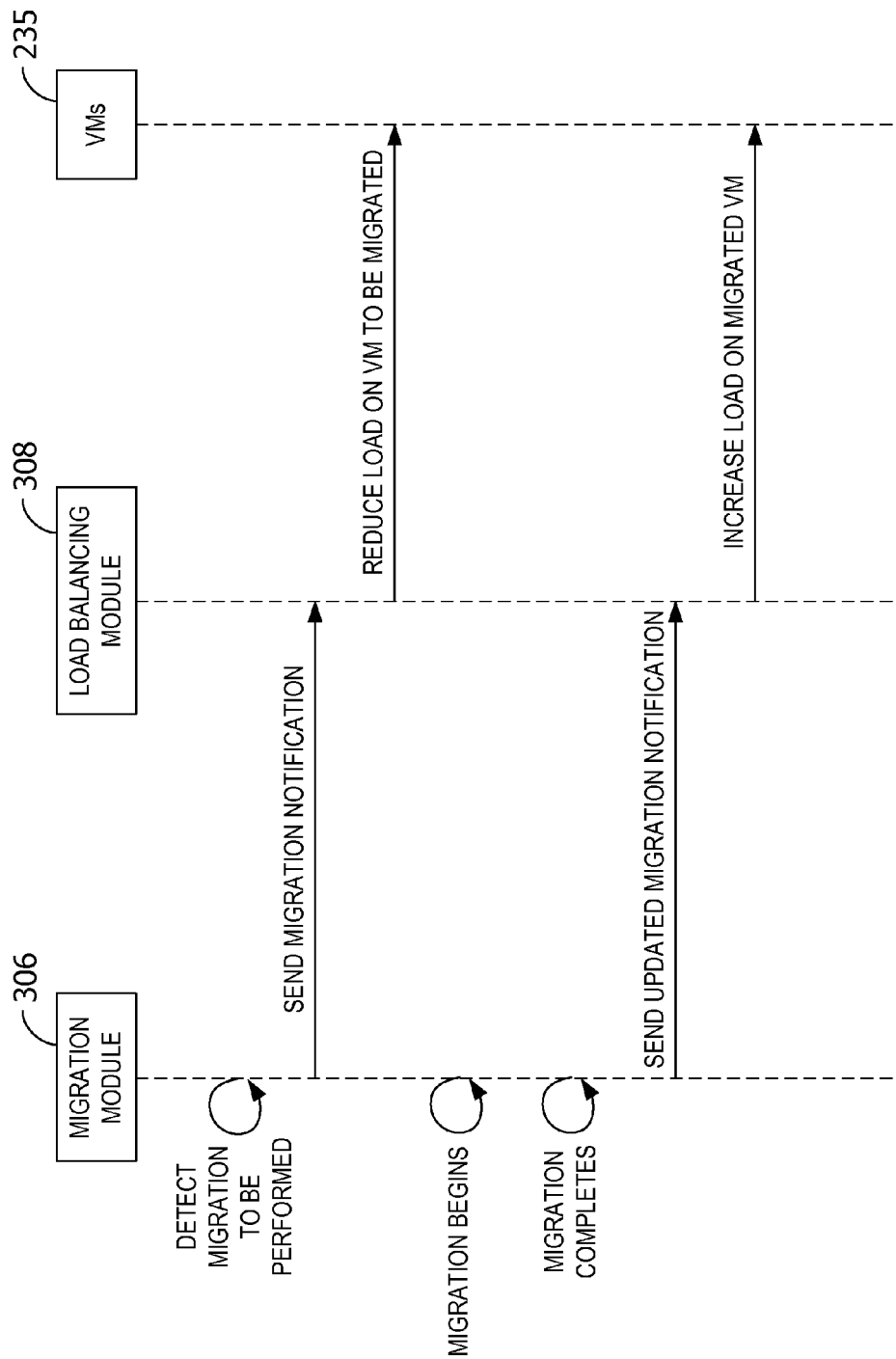
FIG. 6 is a sequence diagram illustrating interaction among the migration module, load balancing module, and one or more VMs.

FIG. 6 is a sequence diagram illustrating interaction among migration module 306, load balancing module 308, and one or more of VMs 235. In some embodiments, migration module 306, load balancing modules 308, and VMs 235 are contained with, or otherwise accessible by, a host such as host computing device 100.

Migration module 306 detects or is notified of an upcoming migration of at least one of VMs 235. Migration module 306 identifies the registered load balancing modules 308 (e.g., load balancing modules 308 possibly affected by the upcoming migration) and sends a migration notification to each of the identified load balancing modules 308 before the migration.

Upon receipt of the migration notification or otherwise responsive to the migration notification, load balancing modules 308 reduce a load on VM 235 to be migrated, such as described herein. In some embodiments, load balancing modules 308 reduce a quantity of the data requests distributed to VM 235 to be migrated by, for example, reducing establishment of new connections to VM 235 to be migrated while maintaining existing connections to VM 235 to be migrated.

Upon completion of the migration, migration module 306 sends an updated migration notification or otherwise notifies load balancing modules 308 of completion of the migration. Upon receipt of the updated migration notification or otherwise responsive to the updated migration notification, load balancing modules 308 increase a load on the migrated VM 235, such as described herein. In some embodiments, load balancing modules 308 gradually increase a quantity of the data requests distributed to the migrated VM 235 until the migrated VM 235 handles a load similar to other VMs 235.

Figure 7:
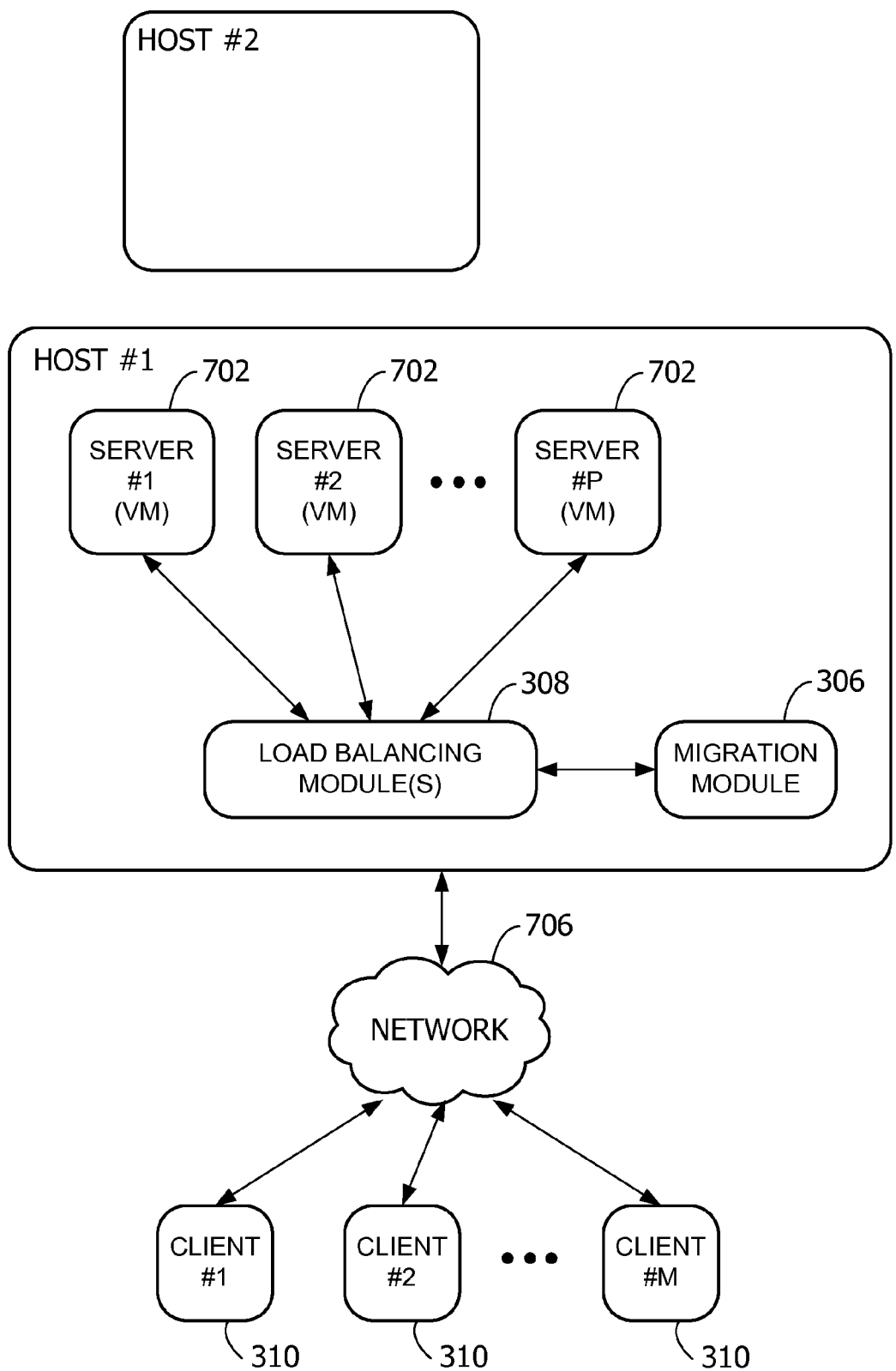
FIG. 7 is a block diagram of a host, such as the host computing device shown in FIG. 1, having a plurality of servers managing data requests from a plurality of clients prior to migration.

FIG. 7 is a block diagram of Host #1, such as host computing device 100 shown in FIG. 1, having a plurality of servers 702 managing data requests from a plurality of clients 310 prior to migration. In the example of FIG. 7, the plurality of clients 310 include client #1 and client #2 through client #M. Clients 310 communicate with Host #1 via a network. Network represents any means for communication between clients 310 and Host #1. Aspects of the disclosure are operable with any network type or configuration. For example, aspects of the disclosure are operable with local area networks (LANs), metropolitan area networks (MANs), wide area networks (WANs), the Internet, or any combination thereof.

Host #1 includes migration module 306 and load balancing modules 308. Load balancing modules 308 distribute data requests received from clients 310 to the plurality of servers 702. The plurality of servers 702 includes server #1 and server #2 through server #P.

In this example, migration module 306 determines or is informed that server #2 is scheduled to be migrated to Host #2. Migration module 306 notifies load balancing modules 308 before the migration occurs.

Figure 8:
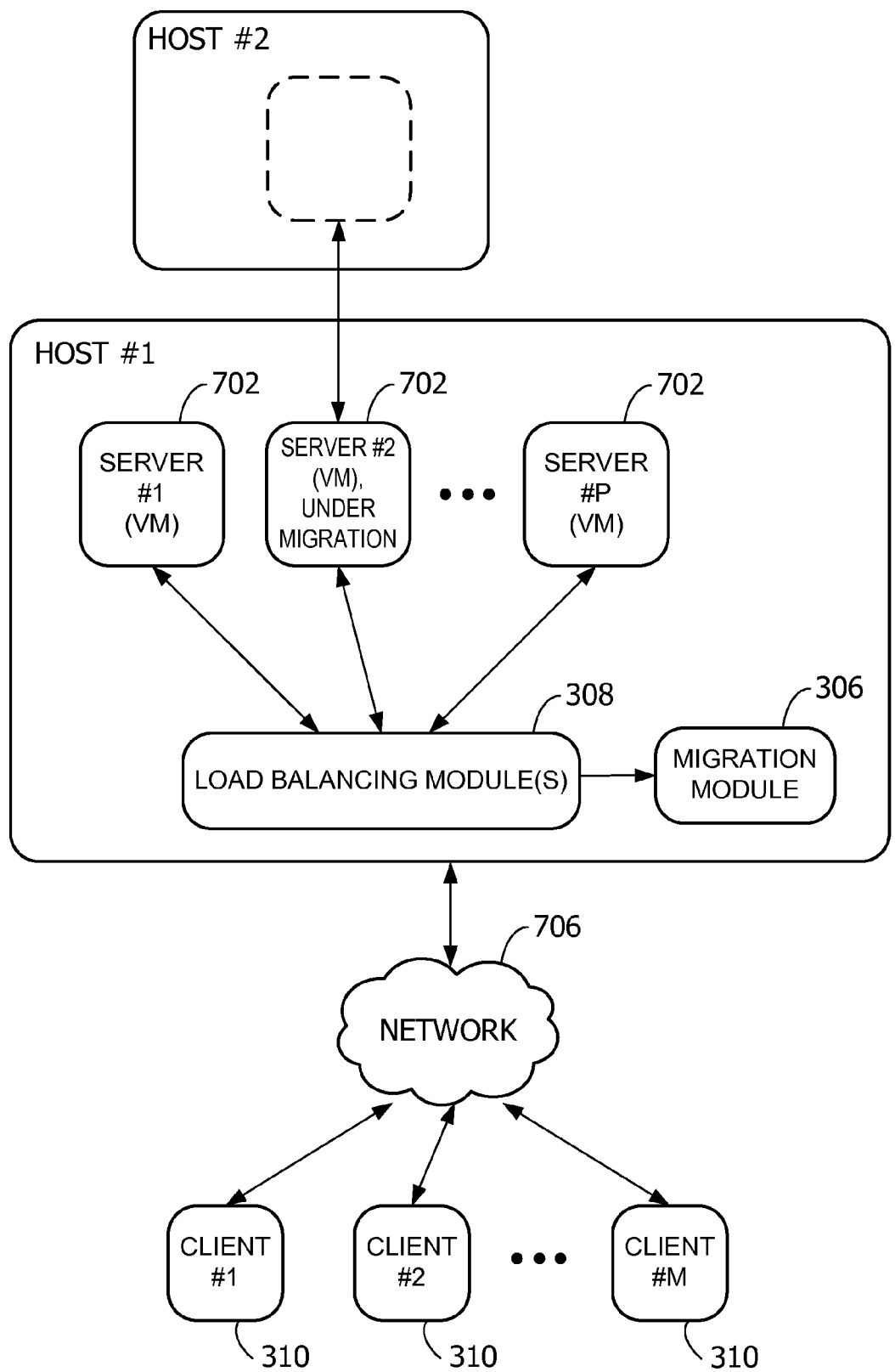
FIG. 8 is a block diagram of the host shown in FIG. 7 during migration of one of the servers to a new host.

FIG. 8 is a block diagram of Host #1 shown in FIG. 7 during migration of one of servers 702 to Host #2. In this example, server #2 is under migration from Host #1 to Host #2. Load balancing modules 308 continue to distribute data requests from clients 310 to servers 702. However, load balancing modules 308 reduce, or completely eliminate, a quantity of the data requests sent to server #2 during the migration.

Figure 9:
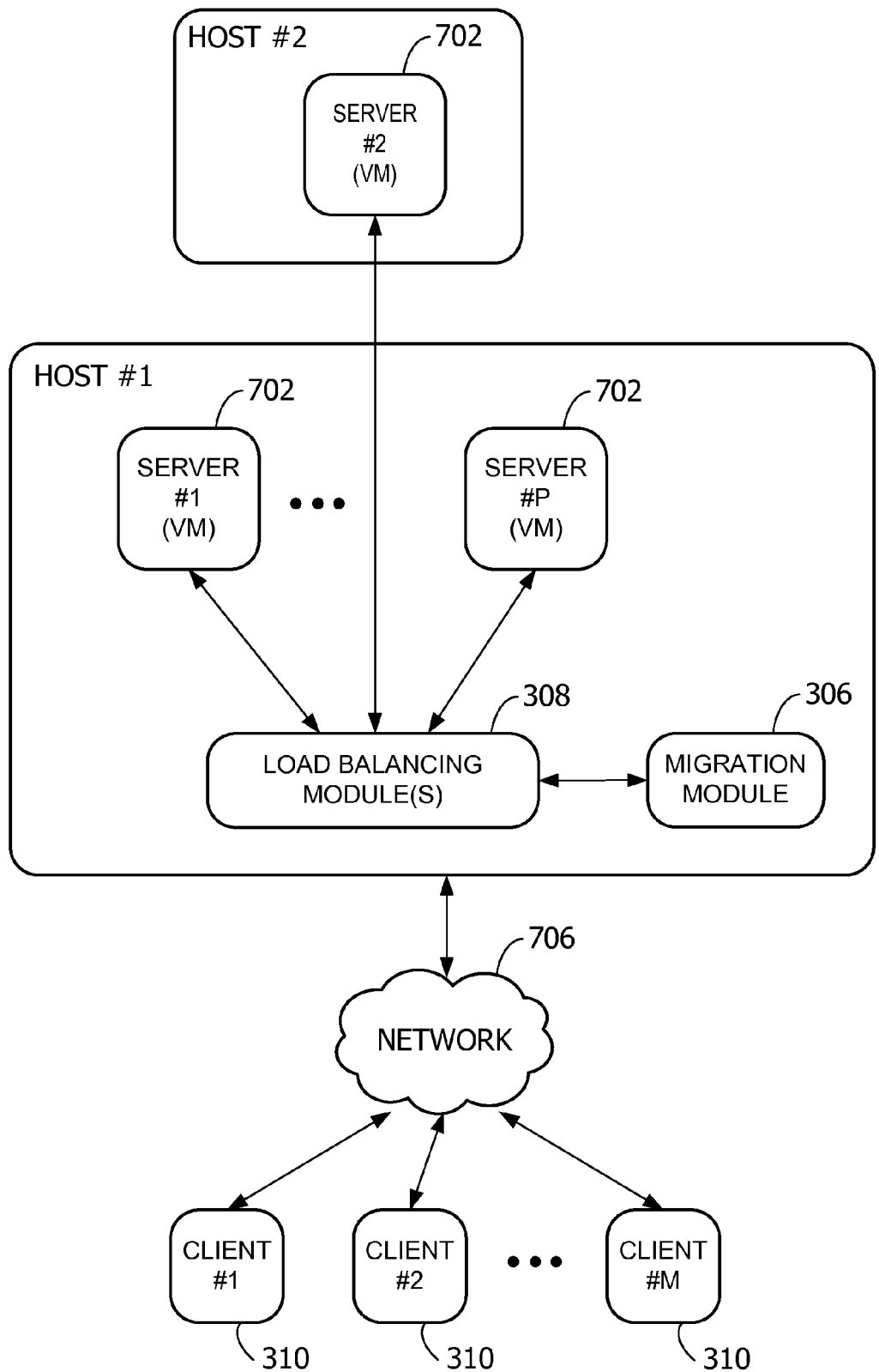
FIG. 9 is a block diagram of hosts shown in FIG. 8 after migration of one of the servers.

FIG. 9 is a block diagram of Host #1 and Host #2 shown in FIG. 8 after migration of server #2. In this example, the migration of server #2 from Host #1 to Host #2 has completed, and server #2 is now located on Host #2. Migration module 306 has informed load balancing modules 308 of completion of the migration, and Host #1 can access server #2 same as before the migration. In response, load balancing modules 308 increase a quantity of the data requests distributed to server #2 until server #2 is treated as it was prior to the migration. In some embodiments, if Host #2 has differing resource capabilities, migration module 306 notifies load balancing modules 308 of the resource capabilities. Load balancing modules 308 use the resource capabilities as input to load balancing algorithms implemented by load balancing modules 308.

In the example of FIG. 9, Host #1 and Host #2 use the same Internet Protocol (IP) address, so there are no changes to connections managed by load balancing modules 308.

Additional Examples

The following scenarios are merely exemplary and not intended to be limiting in any way.

Aspects of the disclosure respond to failures such as failure of the migration process and failure of one or more of load balancing modules 308. For example, if the hypervisor detects failure of the migration process (e.g., after receiving an error code or after a pre-defined timeout duration elapses), migration module 306 sends notification of the failure to the affected load balancing modules 308. In response, load balancing modules 308 put the affected VM 235 back in a queue for dispatching.

If one of load balancing modules 308 reboots, load balancing module 308 re-registers with migration module 306 after coming online again. Load balancing module 308 also flushes old migration state information from prior to the failure and obtains new migration state information.

Aspects of the disclosure are not limited to any particular format of the migration notification. An exemplary, non-limiting migration notification may have the following format: Version (one octet for a version number) and VM-uuid (sixteen octets for a UUID of the VM 235 generating the event). One or more type-length-value (TLV) elements may follow these fields. Each of the TLV elements may have the following exemplary format: Type (one octet for an integer value identifying the type of information), Length (one octet for a length of the value field to follow, in octets), and Value (one or more octets for a variable-length octet-string containing specific TLV information). Some embodiments contemplate standard types. An exemplary start event may be represented as Type: 0, Length: 5, and Value: "start". An exemplary finish event may be represented as Type: 0, Length: 6, and Value: "finish".

An exemplary migration notification format may also support vendor-specific extensions. For example, type 255 may be reserved for such extensions. An exemplary extension format may be defined as: Type (one octet of 255), Length (one octet), and Value (four octets for Extension-ID, one or more octets for Extension-value).

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, exclude propagated data signals, and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure (e.g., as clients) include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The embodiments illustrated and described herein as well as embodiments not specifically described herein but within the scope of aspects of the invention constitute exemplary means for migration-aware load balancing in virtual data centers, and exemplary means for reducing performance degradation during live migration of at least one of VMs 235.

At least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A system comprising:
   a memory area associated with a first host, said memory area storing a migration module and one or more load balancing modules, the load balancing modules distributing data requests to a plurality of virtual machines (VMs); and
   a processor programmed to:

send a migration notification from the migration module to each of the identified load balancing modules before a migration of at least one of the plurality of VMs to a second host begins, the migration notification being an interrupt or an event notification;

reduce, by the load balancing modules responsive to the migration notification, a quantity of the data requests distributed to the at least one of the plurality of VMs by reducing establishment of new connections to the at least one of the plurality of VMs while maintaining existing connections to the at least one of the plurality of VMs;

send an updated migration notification from the migration module to each of the identified load balancing modules upon completion of the migration; and increase, by the load balancing modules responsive to the updated migration notification, a quantity of the data requests distributed to the at least one of the plurality of VMs.

2. The system of claim 1, wherein the processor is further programmed to detect completion of the migration.

3. The system of claim 1, wherein the plurality of VMs correspond to web servers, and wherein the data requests comprise requests by client devices for content from the web servers.

4. The system of claim 1, wherein the migration corresponds to a live migration.

5. The system of claim 1, further comprising means for migration-aware load balancing in virtual data centers.

6. The system of claim 1, further comprising means for reducing performance degradation during live migration of the at least one of the plurality of VMs.

7. A method comprising:
distributing, by a load balancing module, data requests to a plurality of virtual machines (VMs) accessible to a first host;

receiving a migration notification from a migration module before a migration of at least one of the plurality of VMs to a second host begins, the migration notification being an interrupt or an event notification; and in response to the received migration notification, reducing a quantity of the data requests distributed by the load balancing module to the at least one of the plurality of VMs on the first host to reduce a load on the at least one of the plurality of VMs.

8. The method of claim 7, further comprising registering with the migration module to receive the migration notification from the migration module.

9. The method of claim 7, further comprising receiving the data requests from a plurality of computing devices.

10. The method of claim 7, wherein reducing the quantity comprises reducing a quantity of new connections established to the at least one of the plurality of VMs.

11. The method of claim 7, wherein reducing the quantity comprises reducing a quantity of the data requests distributed to the at least one of the plurality of VMs relative to a quantity of the data requests distributed to other VMs.

12. The method of claim 7, wherein receiving the migration notification comprises receiving a migration notification of a live migration during which virtual memory and non-memory state are copied from the first host to the second host.

13. The method of claim 7, wherein receiving the migration notification comprises receiving a migration notification indicating when the migration is scheduled to commence.

14. The method of claim 7, further comprising:
receiving an updated migration notification from the migration module, the updated migration notification indicating completion of the migration; and in response to the received, updated migration notification, increasing the quantity of the data requests distributed by the load balancing module to the at least one of the plurality of VMs on the second host.

15. One or more computer-readable storage media including computer-executable instructions that, when executed, cause at least one processor to improve load balancing performance during migration by:
identifying one or more load balancing modules associated with a first host, the load balancing modules distributing data requests to a plurality of virtual machines (VMs);

sending a migration notification to each of the identified load balancing modules before a migration of at least one of the plurality of VMs to a second host begins, the migration notification being an interrupt or an event notification, the identified load balancing modules responding to the migration notification by reducing a quantity of data requests distributed to the at least one of the plurality of VMs; and sending an updated migration notification to each of the identified load balancing modules upon completion of the migration, the identified load balancing modules responding to the updated migration notification by increasing a quantity of data requests distributed to the at least one of the plurality of VMs.

16. The computer storage media of claim 15, wherein the computer-executable instructions cause the processor to send the migration notification by sending the migration notification to each of the identified load balancing modules at least a tenth of a second before the migration.

17. The computer storage media of claim 15, wherein the computer-executable instructions cause the processor to identify the one or more load balancing modules by identifying one or more load balancing modules that have registered with the first host.

18. The computer storage media of claim 15, wherein the computer-executable instructions further cause the processor to send the migration notification by sending the migration notification from a migration module associated with the first host.

19. The computer storage media of claim 15, wherein the computer-executable instructions cause the processor to send the migration notification by sending a migration notification including a description of resources shared by the first host and by the second host.

* * * * *